United States Patent [19]

Davis

[11] 4,099,944

[45] * Jul. 11, 1978

[54] FILTERS

[75] Inventor: Maurice Davis, Croydon, England

[73] Assignee: Davis Industrial (Equipment) Limited, Croydon, England

[*] Notice: The portion of the term of this patent subsequent to Apr. 11, 1994, has been disclaimed.

[21] Appl. No.: 495,413

[22] Filed: Aug. 7, 1974

Related U.S. Application Data

[63] Continuation-in-part of Ser. No. 272,023, Jul. 14, 1972, abandoned.

[30] Foreign Application Priority Data

Jul. 14, 1971 [GB] United Kingdom ............ 32968
Jul. 27, 1972 [AU] Australia ........................ 45052
Jul. 17, 1972 [FR] France ........................... 25728
Nov. 21, 1973 [CA] Canada ........................... 186424

[51] Int. Cl.² .......................................... B01D 46/10
[52] U.S. Cl. ................................ 55/501; 55/502; 55/503; 55/509; 55/529; 210/484
[58] Field of Search ............... 55/491, 492, 493, 495, 55/499, 500, 501, 502, 504, 505, 512, 513, 514, 515, 503, 516, 486, 487, 511, 509, 529; 210/484, 485, 486; 261/DIG. 54

[56] References Cited

U.S. PATENT DOCUMENTS

| 1,728,140 | 9/1929 | Stever ........................ 55/516 |
| 2,378,839 | 6/1945 | Ensign ..................... 55/501 X |
| 3,047,994 | 8/1962 | Le Brun .................... 55/493 |
| 3,209,916 | 10/1965 | May et al. ............... 210/484 X |
| 3,389,031 | 6/1968 | Rosaen et al. ........... 55/514 X |
| 3,418,794 | 12/1968 | Roberts ................... 55/511 X |
| 3,423,909 | 1/1969 | Bennett et al. ............ 55/498 |
| 3,747,772 | 7/1973 | Brown ..................... 55/502 X |

FOREIGN PATENT DOCUMENTS

| 873,130 | 7/1961 | United Kingdom .......... 55/500 |
| 1,349,971 | 4/1974 | United Kingdom .......... 55/495 |

Primary Examiner—Frank W. Lutter
Assistant Examiner—David L. Lacey
Attorney, Agent, or Firm—Scrivener, Parker, Scrivener & Clarke

[57] ABSTRACT

A filter suitable for filtering gases comprising a resilient foamed synthetic plastics filter element having a perforate support extending thereacross, and a peripheral resilient foamed synthetic plastics sealing frame, the edges of the element being located in a channel of the frame and secured therein by marginal portions of the perforate support extending into the frame.

11 Claims, 7 Drawing Figures

FILTERS

This is a continuation-in-part of application Ser. No. 272,023 filed July 14, 1972, now abandoned.

This invention is concerned with improvements in and relating to filters.

It is an object of the invention to provide a simple, robust filter construction which is particularly suitable for filtering gases in applications in which space limitations preclude the use of relatively thick corrugated filters.

According to one aspect of the invention, there is provided a filter unit and a resilient sealing member extending around the periphery of the filter unit, the periphery of said filter unit being received in a channel formed around the entire inner periphery of said sealing member by a pair of opposed inwardly directed flanges, said filter unit comprising a resilient filter element, and a perforate filter support member comprising a grid which extends over a first face of said filter element and is provided at its periphery with a turned marginal portion which projects into and makes releasable locking engagement with a flange of said sealing member so as to secure the filter unit to said sealing member.

The filter can be located within a duct to filter a gas stream passing therethrough. Alternatively, the filter can be used as a terminal filter, being incorporated in or forming an outlet vent for an air-conditioning system for a building.

Features and advantages of the present invention will appear from the following description of several embodiments of the filter, given by way of example only, reference being had to the accompanying drawings in which.

Figure 1:
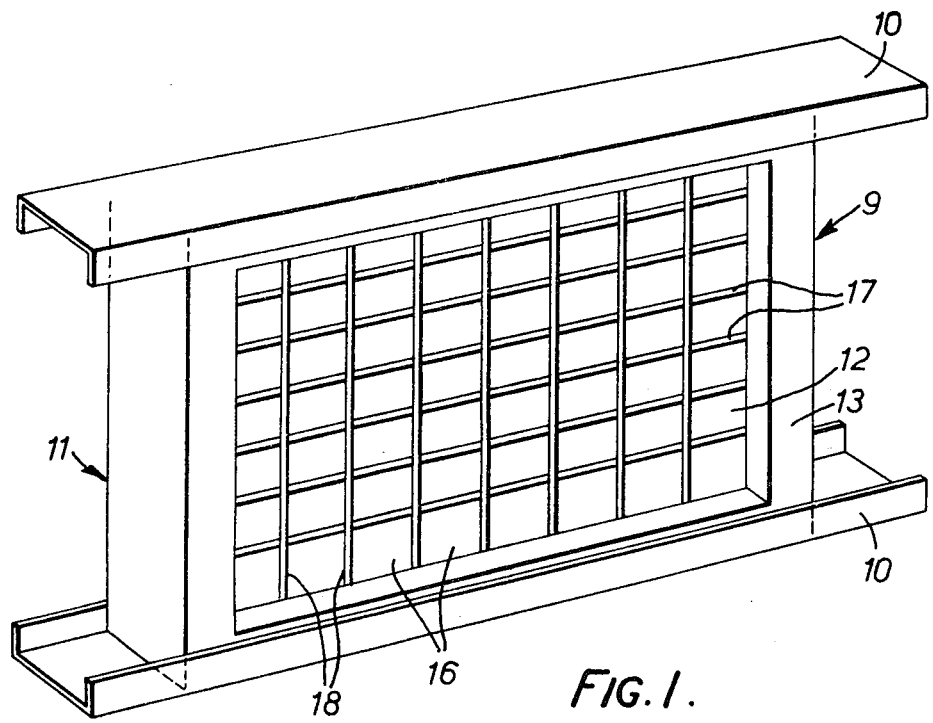
FIG. 1 is a perspective view of a filter embodying the invention.
Figure 2:
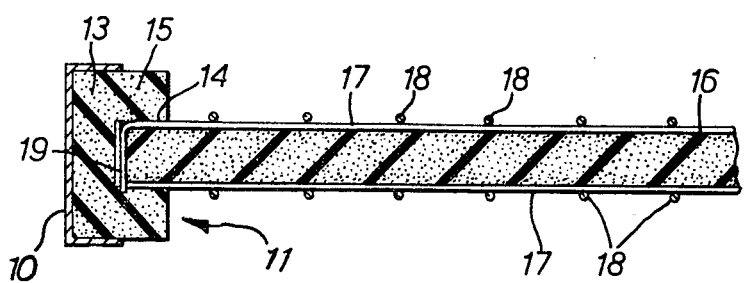
FIG. 2 is a side elevation in section of a filter similar to that shown in FIG. 1.
Figure 6:
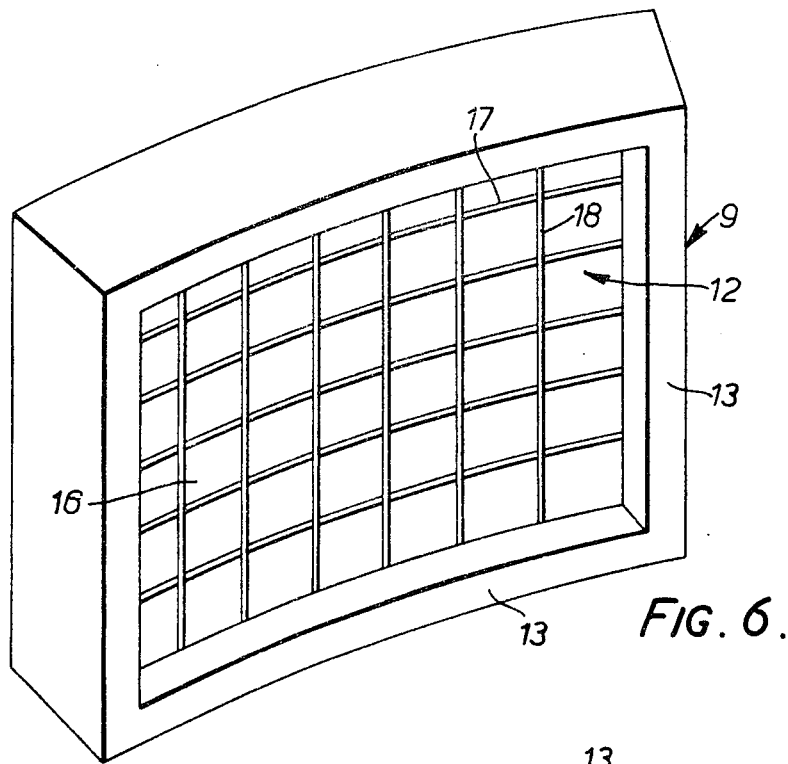
FIG. 6 is a perspective view of a filter embodying the invention but curved approximately about a horizontal axis.
Figure 7:
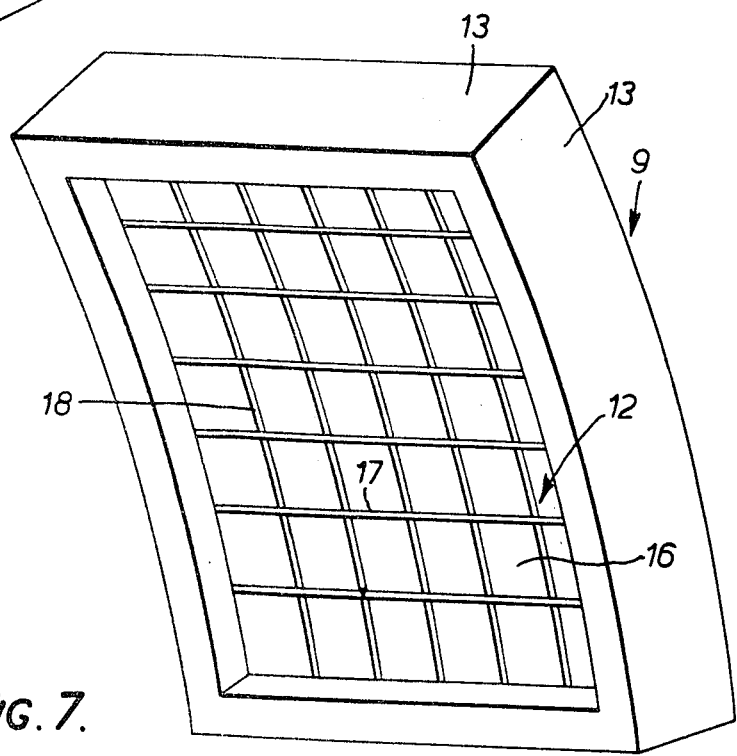
FIG. 7 is a perspective view similar to FIG. 6 but showing a filter curved approximately about a vertical axis.

With reference to FIGS. 1 and 2 there is shown a filter, indicated generally at 9, which is mounted in opposed channel-section rigid guides 10 and comprises a resilient peripheral sealing member 11 and filter unit 12. As shown here, the filter 9 is of rectangular form, although it may be of other shapes, for example circular. Additionally, as shown here the filter is generally planar, although it may be curved if required as shown in FIGS. 6 and 7.

The sealing member 11 is formed of four side members 13, each having a channel 14 in which the periphery of the filter unit is located; the channel 14 being formed by inwardly directed flanges 15.

The filter unit 12 has a filter element 16, consisting of a rectangular sheet of resilient filter material. This preferably is of spongey resilient foamed synthetic plastics material, such as polyether, in which the cells communicate with one another, although other known filter materials can be used. Positioned on each face of the filter element, and also forming part of the filter unit, is a perforate support here formed of cross pieces 17 held in a parallel spaced relationship by connecting pieces 18. The ends of some or all of the pieces 17, 18 are bent at right angles at the edges of the filter element so as to provide marginal portions 19 composed of prongs which project beyond the opposite faces of the filter element 16 into flanges 15 of the side members 13, and form a close fitting cage structure supporting the filter element. By projecting into the side members in this manner, the pieces 17, 18 serve to hold the side members in a close sealing engagement with the filter unit.

The cross pieces 17 and connecting pieces 18 conveniently may be formed of wire, welded or otherwise connected at their points of intersection.

The internal spacing of the side walls of the channel-section guides 10 is such that each side member to be received by a guide is compressed so that the oppositely directed outer faces of those side members are urged into sealing engagement with those side walls. Guides 10 may be at opposite sides of a duct or they can define two sides of an outlet, and one filter can be received therein, or a plurality of side-by-side filters, with adjacent side members 13 in contact and effecting a seal between adjacent filters. Alternatively, the guides 10 can be part of a series of such members to accommodate a bank of filters.

In an alternative embodiment, the perforate support can comprise a grid 20 (see FIGS. 3 and 4) of integral construction and formed, for example, by injection moulding of thermo-plastics material. The grid 20 has a generally planar central grid or lattice portion 21 to support the filter element 16, and a marginal flange portion 22, to project into a flange of side members 13.

Figure 3:
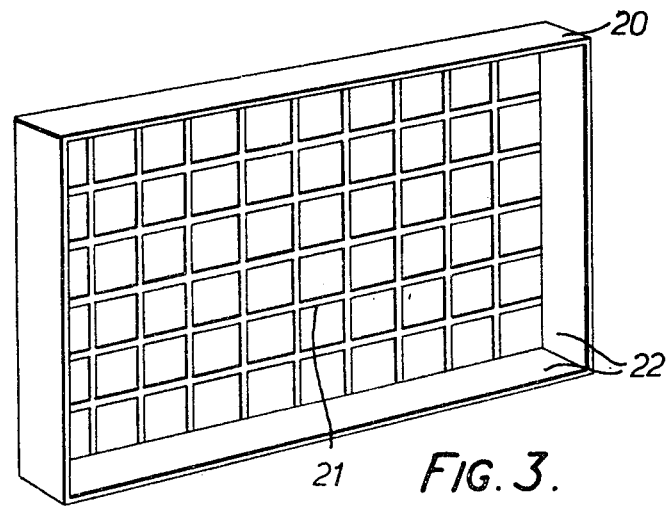
FIG. 3 is a perspective view of an alternative form of perforate filter support member to that used in the filter shown in FIG. 1.
Figure 4:
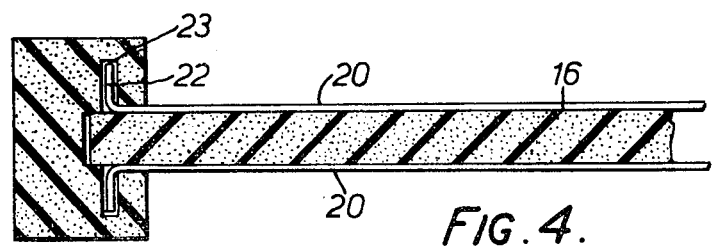
FIG. 4 is a side elevation in section of a filter having a perforate filter support member as shown in FIG. 3.
Figure 5:
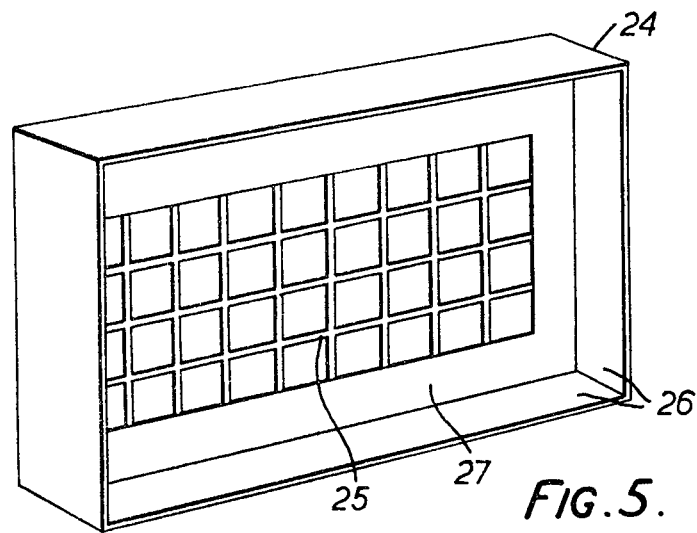
FIG. 5 is a perspective view of another alternative form of perforate filter support member.

A groove 23 can be provided along the inner surface of each flange of the side members. This is of assistance when assembling the filter, particularly where a support of the form shown in FIGS. 3 and 4 is used.

Where it is intended to use this filter as a terminal filter, the perforate support can be provided by a box-like grid arrangement 24 such as shown in FIG. 5. In this instance the perforate support, which has a grid or lattice portion 25 and a marginal flange portion 26 extending rearwardly thereof from outwardly directed peripheral flange portion 27, serves a dual function of providing both a perforate support for the filter element and a decorative fascia which can be mounted across a ducting outlet. Again the support can be formed by injection moulding of a suitable thermo-plastics material.

Where the perforate support is as shown in FIGS. 1 and 2, with the marginal portions 19 extending across the periphery of the filter element, it is found that excellent sealing engagement between the filter element and the sealing member can be obtained. Thus, where possible, this arrangement generally is to be preferred although it is not essential. It will be seen that with a moulded plastic perforate support, at least of the form shown in FIGS. 3 and 4, this arrangement is not possible where two such supports are used, due to interference between the marginal flange portions 22 of the supports, and in such a case it is necessary for the flange to project away from the filter element and into the adjacent flange of the sealing member.

As indicated, only one perforate support member need be used, although it is preferred to use two supports, as indicated in FIGS. 1 and 2. However, if only one support is used, the filter is positioned with the perforate support member on the downstream side so that it holds the filter element against the gas flow as well as securing it within the sealing members.

Generally, it is convenient to use perforate supports having grid opening dimensions of from ½ to 2 inches. Clearly it is desirable for the members forming the grid, e.g. pieces 17, 18 in FIG. 1, to be relatively narrow so as to optimise the effective area of the filter.

Preferably, the sealing side members 13 also are formed of spongey resilient foamed synthetic plastics material, although again other materials can be used if required.

Filters constructed according to this invention can be relatively thin; for example, filters having a thickness of from 1 to 2¼ inches, and in which the filter element accounts for approximately one third of the total thickness, are found to be both robust and efficient. In some applications filters having a thickness of ½ to ¾ inch can be used. The filters have a further advantage in that the sealing members can be readily disengaged from the marginal portion of the perforate support to permit removal of the filter element for cleaning or replacement.

What is claimed is:

1. A disassemblable filter assembly comprising a filter unit and a sealing member extending around the periphery of the filter unit, the periphery of said filter unit being releasably sealingly received in a channel formed around the entire inner periphery of said sealing member by a pair of spaced apart opposed inwardly directed flanges, said filter unit comprising a resilient foamed synthetic plastic filter element, and a perforate filter support member including a grid portion which extends over a first face of said filter element and is provided at its periphery with a turned marginal portion which projects into and makes releasable locking engagement with one of said flanges of said sealing member so as to secure the filter unit to said sealing member.

2. A filter assembly according to claim 1 wherein said filter is generally planar.

3. A filter assembly according to claim 2 wherein said perforate filter support member comprises a first right angular wire mesh grid, the ends of at least some of the wires forming the grid being bent to form prongs which extend across the periphery of said filter elements to project into the spaced flange of said sealing member remote from said first face of said filter element.

4. A filter assembly according to claim 3 including a second grid, similar to the first grid but having oppositely directed prongs, said filter element being located between said first and second grids.

5. A filter assembly according to claim 2 wherein said grid and turned marginal portion comprise a unitary injection moulding of thermo-plastics material, said turned marginal portion comprising a flange generally perpendicular to said first face of the filter element and projecting into a groove formed in the flange of said sealing member adjacent said first face.

6. A filter assembly according to claim 5 including a second grid, similar to the first grid but having an oppositely directed marginal flange portion, said filter element being located between said first and second grids.

7. A filter assembly according to claim 1 wherein said filter unit is curved.

8. A filter assembly according to claim 7 wherein said perforate filter support member comprises a first right angular wire mesh grid, the ends of at least some of the wires forming said grid being bent to form said marginal portion which extends across the periphery of said filter element to project into the spaced flange of said sealing member remote from said first face of said filter element.

9. A filter assembly according to claim 8 wherein said sealing member is formed of foamed synthetic plastic material.

10. A filter assembly according to claim 7 wherein said grid portion and turned marginal portion comprises a unitary injection moulding of thermo-plastics material, said turned marginal portion comprising a flange generally perpendicular to said first face of the filter element and projecting into a groove formed in the flange of said sealing member adjacent said first face.

11. A filter assembly according to claim 10 including a second grid, similar to the first grid but having an oppositely directed marginal flange portion, said filter element being located between said first and second grids.

* * * * *